INVENTOR.
ALFONS J. STEINHART

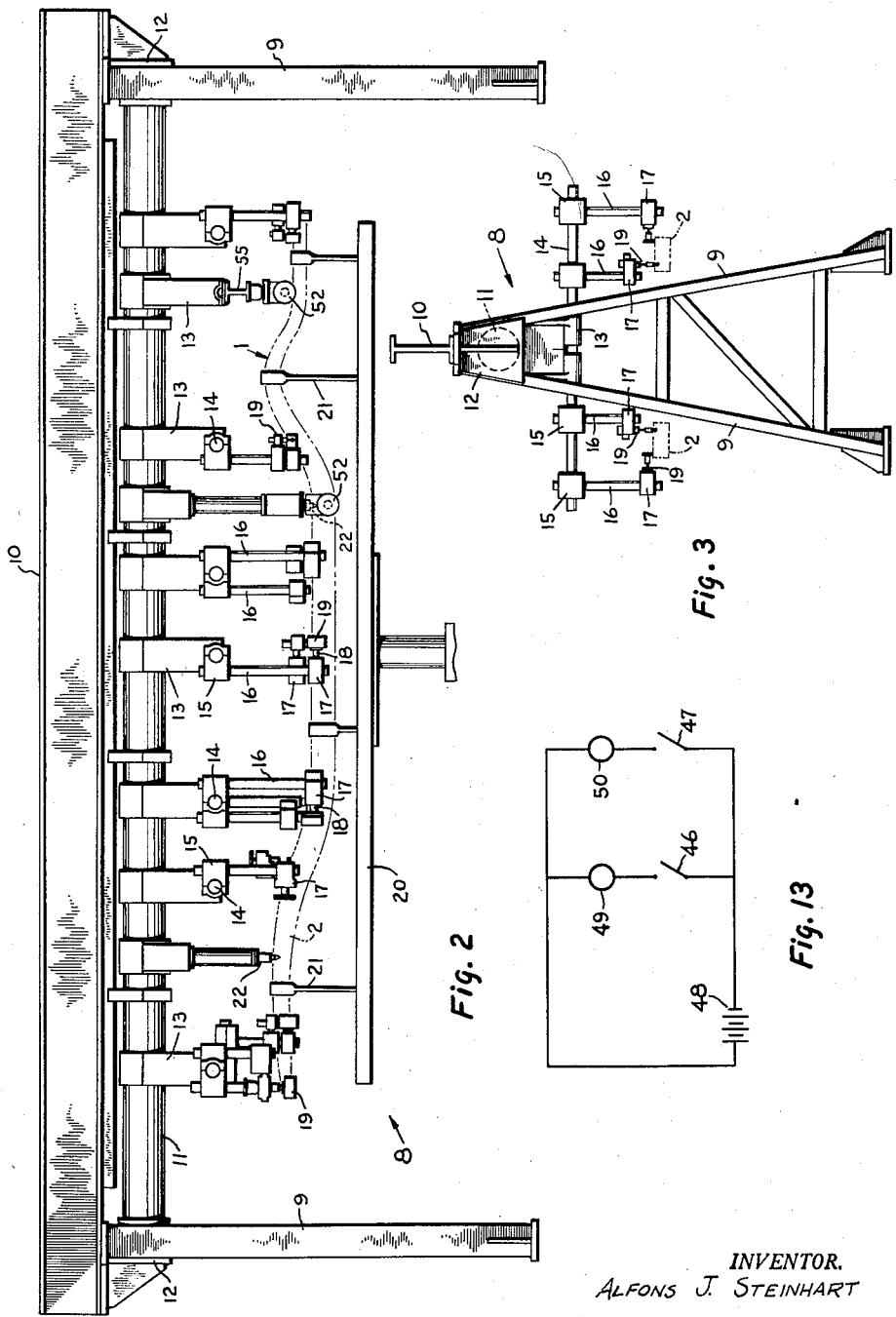

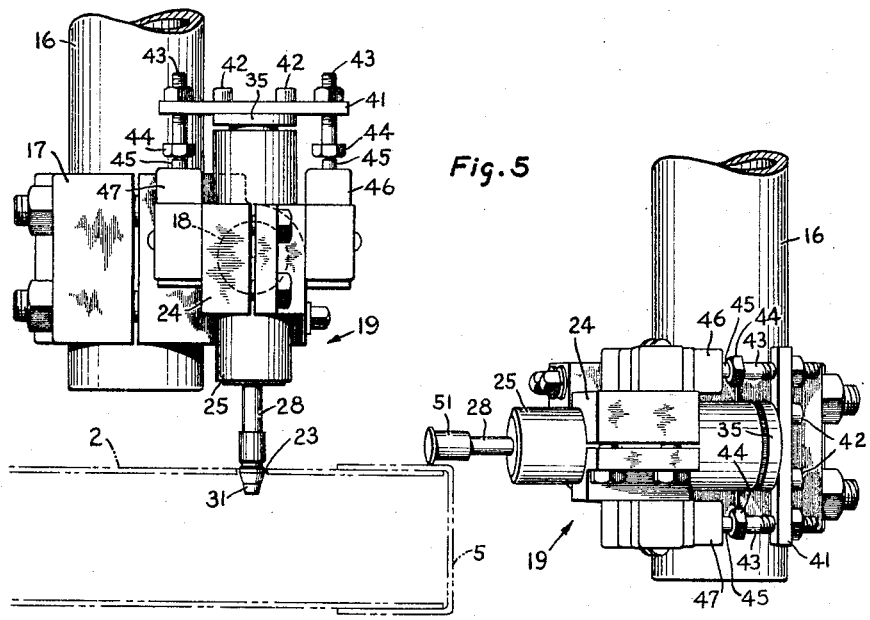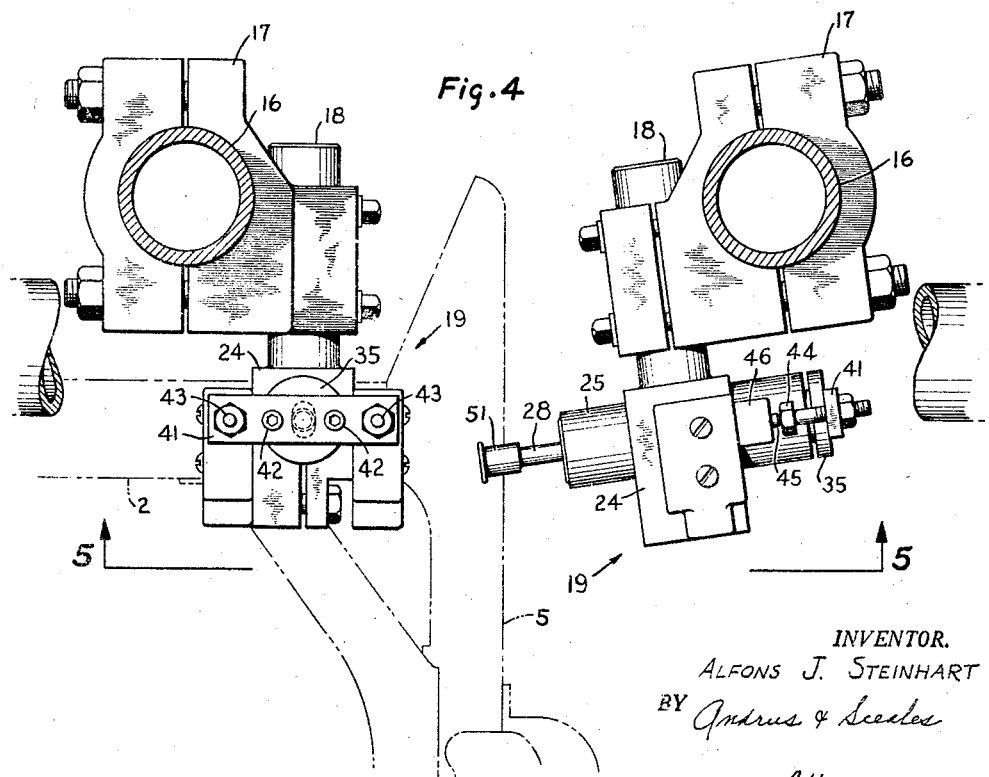

Nov. 10, 1959    A. J. STEINHART    2,911,727
GAUGING APPARATUS FOR INSPECTING VEHICLE FRAMES
Filed Sept. 12, 1955    6 Sheets-Sheet 6

INVENTOR.
ALFONS J. STEINHART
BY
Attorneys

United States Patent Office 2,911,727
Patented Nov. 10, 1959

2,911,727

GAUGING APPARATUS FOR INSPECTING VEHICLE FRAMES

Alfons J. Steinhart, Milwaukee, Wis., assignor to A. O. Smith Corporation, Milwaukee, Wis., a corporation of New York Application September 12, 1955, Serial No. 533,669

9 Claims. (Cl. 33—174)

This invention relates to a gauging apparatus for inspecting vehicle frames and more particularly to an apparatus for gauging the alignment of the elements of the frame after the assembly of the frame and for automatically indicating the position and degree of any misalignment.

In an automatic assembly line for vehicle frames each frame is generally visually inspected and only periodically is a frame given a spot check for misalignment. This spot check is made by removing the frame from the line and placing it on a surface board where, by means of gauges, the frame is checked against a standard model. If the frame is out of alignment, corrections are made in either the fabrication of the frame elements or in the assembly of the elements to correct the misalignment. As the frames are only periodically checked, misalignments in the frame may occur between these spot checks and go unnoticed for extended periods.

The present invention is directed to a gauging apparatus for checking the alignment of each vehicle frame after assembly and for automatically indicating the position of any misalignment and the degree thereof. The gauging apparatus provides a continuous or running check of each frame and enables corrections to be made more quickly after a misalignment is indicated.

According to the invention the gauging apparatus consists of a fixture within which the frame is positioned and aligned. A series of feelers are carried by the fixture and are disposed to engage the frame at various locations. For example, a number of the feelers may engage the openings in the spring hangers, others may engage the surfaces of the side rails, while still others may engage openings in the side rails, motor mount or end bar. Each of the feelers is mounted for universal pivotal movement so that it may be pivoted in all directions and any misalignment of the opening or surface to be gauged by a specific feeler will be reflected as a pivotal movement of the feeler and a predetermined amount of pivotal movement is adapted to close an electric circuit to light up a lamp which indicates that the misalignment at that particular opening or surface of the frame is approaching the maximum allowable tolerance. Further pivotal movement of the feelers to a second predetermined degree resulting from a greater misalignment closes a second electric circuit to light up a second lamp which indicates that the frame at that particular location is out of tolerance.

By observing the lamps the operator can see the position of misalignment and whether the degree of misalignment is within or outside the tolerances. As the degree of misalignmentt approaches the maximum tolerance the operator can effect the necessary corrections in prior portions of the assembly line or in the production line of the frame elements to effect re-alignment of the portion of the frame at which the misalignment is indicated.

The drawings illustrate the best mode presently contemplated of carrying out the present invention.

In the drawings:

Fig. 2 is a side elevation of the gauging apparatus of Figure 1;

Fig. 3 is an end view of the apparatus of Figure 1;

Fig. 4 is an enlarged top plan view of a portion of the gauging apparatus showing a pair of feeler units;

Fig. 5 is a view taken along line 5—5 of Fig. 4;

Fig. 13 is a diagrammatic showing of the electric circuit employed to light the panel lamps.

Figure 1:
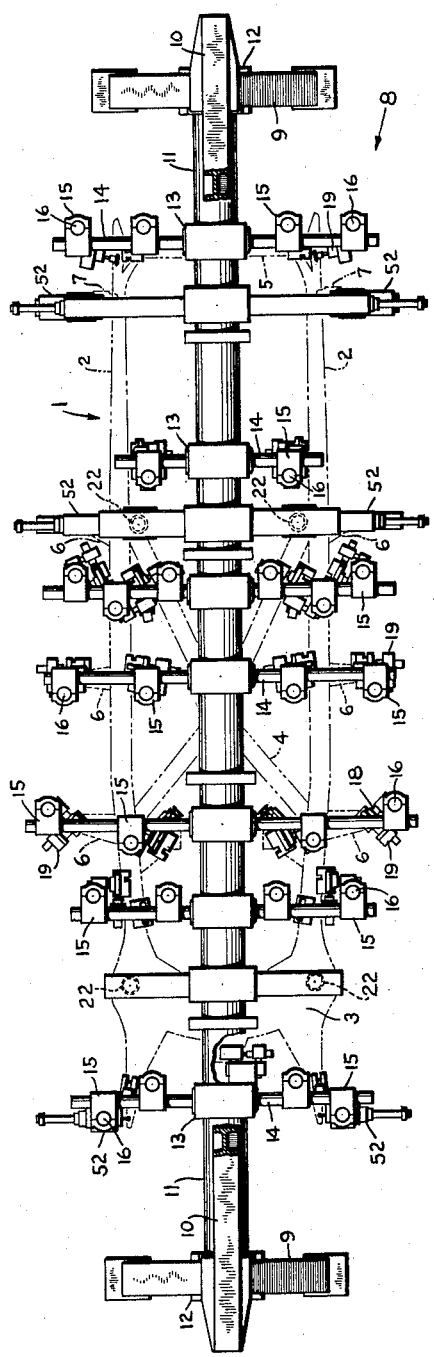
Figure 1 is a top plan view of the gauging apparatus with the frame to be gauged indicated by dashed lines.

The drawings illustrate a gauging apparatus for inspecting vehicle frames in an assembly line. As best shown in Figs. 1 and 2 the vehicle frame 1 consists of a pair of side rails 2 which extend the length of the frame and are connected at the forward end by a motor mount 3, at the center by a cross member 4 and at the rear end by an end bar 5. In addition, the side rails carry a plurality of body brackets 6 which support the vehicle body and a series of spring hangers 7 which serve to support the spring suspension for the wheels of the vehicle.

The vehicle frame is gauged in a fixture 8 which includes a pair of generally A-shaped end frames 9 which are connected at their upper extremities by a beam 10. A pipe 11 extends between A-frames 9, beneath the beam 10, and the ends of the pipe 11 are secured to the corresponding A-frame by means of brackets 12.

The gauging mechanism employed to check the alignment of the frame is supported by a plurality of hangers 13 which are secured to pipe 11. Each of the hangers 13 extends downwardly from pipe 11 and carries a generally horizontal shaft 14. A plurality of adjustable split ring clamps 15 are removably secured to shaft 14 and each clamp 15 adjustably supports one or more vertically extending shafts 16. As best shown in Figs. 4 and 5, the lower end of shaft 16 is removably secured to a second split ring clamp 17 and the clamp 17 also is removably secured to a second horizontal shaft 18. A feeler unit 19 is secured to the end of each shaft 18 and serves to engage a specific location on the frame and gauge that location for misalignment.

By use of the shafts 14, 16 and 18 and the adjustable split ring clamps 15 and 17, the position of the feeler units can be adjusted in three directions. That is, by moving clamp 15 on shaft 14 the lateral portion of the corresponding feeler unit can be varied and by adjusting the position of the vertical shaft 16 within clamp 15 the vertical position of the feeler unit can be changed, and finally by adjusting the position of shaft 18 within clamp 17 the longitudinal location of the feeler unit with respect to the frame can be altered. With this system of adjustment the feeler unit can be positioned to engage any particular location on the frame.

The vehicle frame 1 is brought into the fixture 8 by means of a lifter member 20 which supports the frame and is adapted to be moved vertically to elevate the frame into the fixture 8 prior to the gauging operation and to lower the frame from the fixture after the gauging operation has been completed. The frame 1 is positioned on the lifter member by a plurality of generally U-shaped clamps 21 which receive and loosely hold the side rails of the frame. It is contemplated that fluid or mechanical actuated clamps whihc positively engage and hold the frame may be employed in place of the U-shaped clamps 21, depending on the speed and stroke of the lifting operation.

To align the frame within the fixture 8 a plurality of pilot members 22 are secured to hangers 13 and extend downwardly therefrom. The pilot members 22 are adapted to be received within openings in the side rails of the frame as the same is elevated into the fixture 8. The pilot members provide fixed locations or stations and serve as a basis or starting point from which the alignment of the frame members is measured.

As shown in Figs. 1, 2 and 3, the feeler units 19 are adapted to engage various portions of the frame 1. A portion of the feeler units are received within holes in the side rails, motor mount 3, cross member 4 or end bar 5 while a second portion of the feeler units are adapted to engage the surfaces of these members and a third portion of the feeler units are adapted to register with the openings in the spring hangers 7. Basically the feeler units 19 are of similar construction and function in the same manner. In view of this the following description will be directed toward the feeler units located at the rear end of the frame and which gauge an opening 23 in the side rail 2 and gauge the upper surface of the end bar 5.

Figure 11:
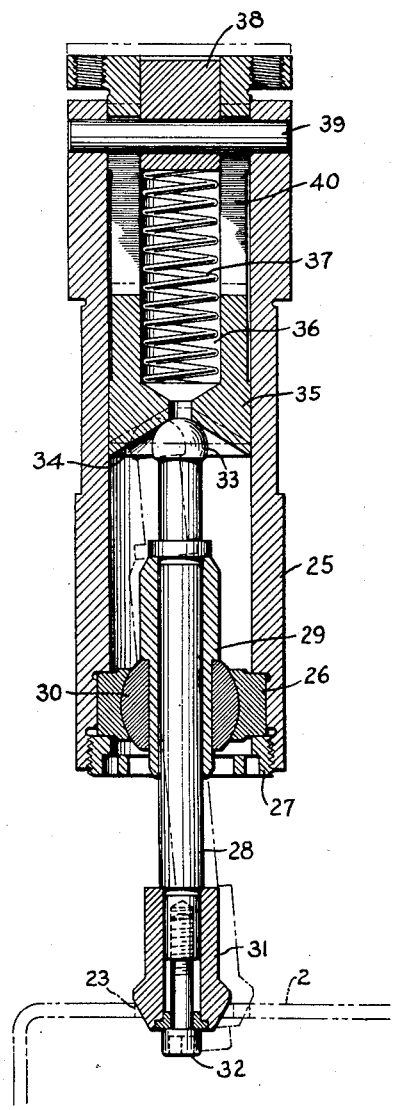
Fig. 11 is an enlarged longitudinal section of a feeler unit of Fig. 5.

Each feeler unit 19 comprises a block 24 which is secured to the end of the corresponding shaft 18. A generally cylindrical housing 25 is removably secured within an opening in block 24, and a generally spherical bearing socket 26 is disposed within the one end of housing 25. As shown in Fig. 11, the bearing socket 26 is retained in position within a recess formed in the inner wall of housing 25 by a retaining ring 27.

An elongated feeler 28 is disposed within housing 25 with the outer end of the feeler projecting a substantial distance outwardly of the housing. The central portion of feeler 28 carries a bearing journal 29 and a spherical bearing 30 is secured around the journal 29. The bearing 30 is adapted to fit within the spherical socket 26 and thereby permit the feeler 28 to be pivoted with universal movement about the axis of housing 25.

The outer end of feeler 28 is provided with a head 31 which is secured to the feeler by means of a screw 32. The head 31 is provided with a generally tapered end and is adapted to register within the openings 23 in side rail 2 of vehicle frame 1.

The inner end of feeler 28 is provided with a generally spherical contour, as indicated by 33, and is adapted to engage the generally conical end surface 34 of a plunger 35 which is slidably disposed within housing 25. The plunger 35 is provided with a recess 36 which receives a spring 37. The spring 37 tends to urge the plunger 35 inwardly toward the bearing socket 26 and is retained within recess 36 by a spring retainer 38 which is disposed within the outer end of recess 36. A pin 39 extends transversely through the spring retainer 38 and maintains the same in position within recess 36. The plunger 35 is provided with a pair of diametrically opposite slots 40 through which the pin 39 extends and the slots permit the plunger 35 to slide within housing 25 while the pin 39 is fixed in relation to the housing.

With the present construction, spring 37 urges plunger 35 inwardly and biases the conical surface 34 against the spherical end 33 of the feeler 28. If the opening 23 in the end bar 5, within which the feeler is to be received, is in proper alingment, the feeler will register with opening 23 as the frame is elevated into the fixture and will not pivot. However, if the opening 23 is not positioned properly, the feeler 28 will have to pivot slightly to register with the opening. Pivotal movement of feeler 28 about bearing socket 26 results in the inner end 33 of the feeler moving radially and forcing the plunger 35 outwardly within the housing 25. This is shown by the dashed lines in Fig. 11.

A predetermined amount of outward movement of plunger 35 within housing 25 is adapted to close an electric circuit to light up a lamp or bulb on a panel board and thereby indicate the degree of misalignment of the opening 23 in the end bar 5. To accomplish this a bar 41 is secured to the outer end of plunger 35 by bolts 42. A pair of studs 43 are threaded within suitable openings in the ends of bar 41 and the heads 44 of the studs are adapted to engage the plungers 45 of a pair of conventional micro-switches 46 and 47. As shown in Fig. 13, micro-switch 46 is connected in series with a source of electric current 48 and a lamp 49 on a panel board. The second micro-switch 47 is connected in series with a second lamp 50, and the switch 47 and lamp 50 are connected in parallel with the switch 46 and lamp 49. Micro-switch 46 is designed to close the circuit when the plunger 35 and studs 48 are moved outwardly a predetermined amount, while micro-switch 47 is designed to be closed when the plunger and studs have moved outwardly a second predetermined distance which is of greater magnitude than the first predetermined distance. With this construction, if the feeler 28 is pivoted due to the misalignment of the hole 23 in end bar 5, the plunger 35 moves outwardly. If the degree of misalignment and thus the outward movement of plunger 35 is of sufficient magnitude switch 46 will be actuated to light lamp 49 on the panel. Lamp 49 will be of a color, such as amber, which indicates caution and that the misalignment is approaching the tolerance limits.

If the misalignment in the hole 23 in the end bar is still greater, the plunger 35 will move further outwardly until micro-switch 47 is actuated and this in turn will cause lamp 50 to light up indicating that the tolerance limits have been exceeded. Lamp 50 is generally of a red color. When the lamp 50 is lighted the operator will recognize that the misalignment at a specific location has reached the tolerances and that adjustment should be made in the production or assembly line to correct this misalignment.

The feeler units for gauging the surfaces of the frame are similar in structure and function to the feeler units for gauging the openings in the frame elements and differ only in the shape of the head. As best shown in Figs. 4 and 5 the head 51 of the feeler unit adapted to gauge the surface of the frame is generally cylindrical with a flanged end as distinguished from the tapered head employed to gauge openings in the frame. The feeler units which carry the heads 51 operate in a manner similar to that previously described whereby the frame 1 is elevated into the fixture 8 and the upper surface of end bar 5 engages the head 51. If the end bar surface is out of alignment the feeler will be pivoted and pivotal movement of the feeler results in an outward movement of the plunger 35 and a predetermined amount of movement of the plunger actuates a micro-switch and lights a lamp on the control panel. As in the case of the feeler units for gauging holes 23, a series of micro-switches and lamps or bulbs may be employed with each feeler unit employed to gauge the frame surfaces, with each micro-switch being actuated by a successive amount of plunger movement to indicate the degree of misalignment of the frame surface.

In addition to the feeler units for gauging openings in the frame elements and for gauging the surfaces of the frame, a plurality of feeler units 52 are employed to gauge openings in the side rails 2 and spring hangers 7 having generally horizontal axes. As applied to openings 53 in the spring hangers 7, the feeler units 52 are adapted to gauge the horizontal and vertical position of the openings 53, the degree of tilt or misalignment of the openings and also the lateral position of the face 54 bordering the openings. As the axes of the openings 53 are generally horizontal, the feeler units 52 are positively actuated toward the spring hangers 7 to gauge openings 53 when the frame is aligned within the fixture 8 and are withdrawn from engagement with the openings 53 prior to the frame being lowered from the fixture.

Figure 7:
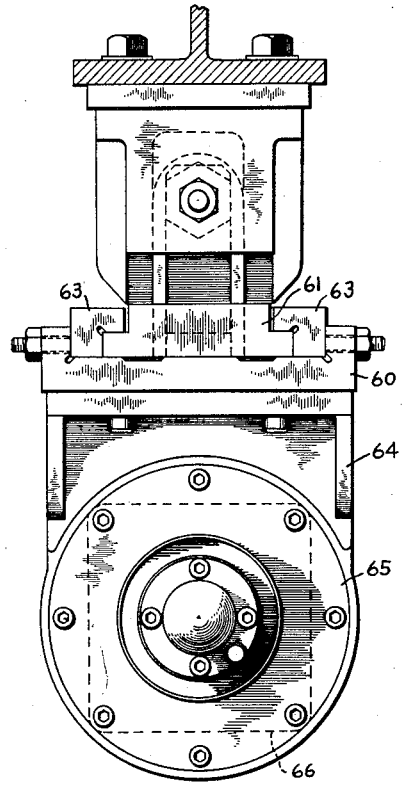
Fig. 7 is an end view of the structure of Fig. 6 taken along line 7—7 of Fig. 6.
Figure 9:
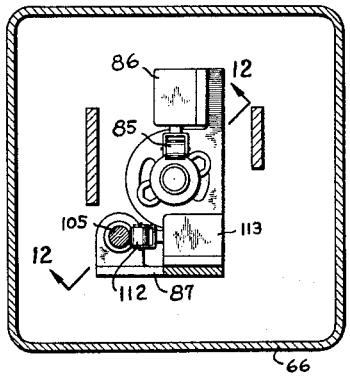
Fig. 9 is a transverse section taken along line 9—9 of Fig. 8.

To support each feeler unit 52 a beam 55 is secured to one of the hangers 13 and the beam carries a box-shaped housing 56. A double-acting hydraulic cylinder 57 is secured to housing 56 and the ram 58 of cylinder 57 extends within the housing. The ends of the cylinder are connected by suitable conduits to a source of fluid under pressure, not shown. The working end of the ram 58 is connected to the upwardly extending arm 59 of a carriage 60 which is adapted to ride on a track 61 that is secured to the lower portion of housing 56. The track 61 is provided with a longitudinal slot 62 through which the arm 59 extends and thereby permits the arm 59 and attached carriage 60 to be moved relative to the housing 56 by action of the ram 58. To slidably secure carriage 60 to track 61 a pair of gibs 63 are secured to the carriage and overhang the track 61, as shown in Fig. 7.

Figure 8:
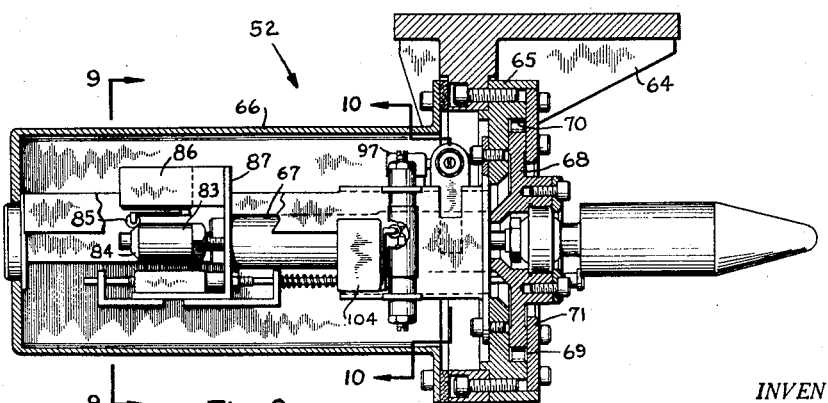
Fig. 8 is an enlarged vertical section showing the mechanism of a retractable feeler unit.

The feeler unit 52 is supported by the carriage 60 and is adapted to move toward and away from the frame in accordance with reciprocating movement of the carriage. The feeler unit comprises a support member 64 which is removably attached to carriage 60 and the support member 64 carries a gauge ring 65. As best shown in Fig. 8, a generally hollow casing 66 is secured to member 64 and extends rearwardly in axial alignment with the gauge ring 65.

The feeler housing 67, which is similar in structure to housing 25, is disposed within casing 66 and is provided with a flange 68 which is disposed within a recess 69 formed in the forward face of gauge ring 65.

The housing 67 is centered within the gauge ring 65 by an annular spring 70 which is located within recess 69 adjacent the outer periphery of the flange 68 of housing 67. The spring 70 serves to resiliently center the feeler housing 67 within the gauge ring 65 and yet permits both horizontal and vertical movement of the housing 67 with respect to the gauge ring. The housing 67 is retained in longitudinal position with respect to gauge ring 65 by a retaining ring 71 which is secured to the outer face of gauge ring 65 and bears against flange 68 of the housing.

Figure 12:
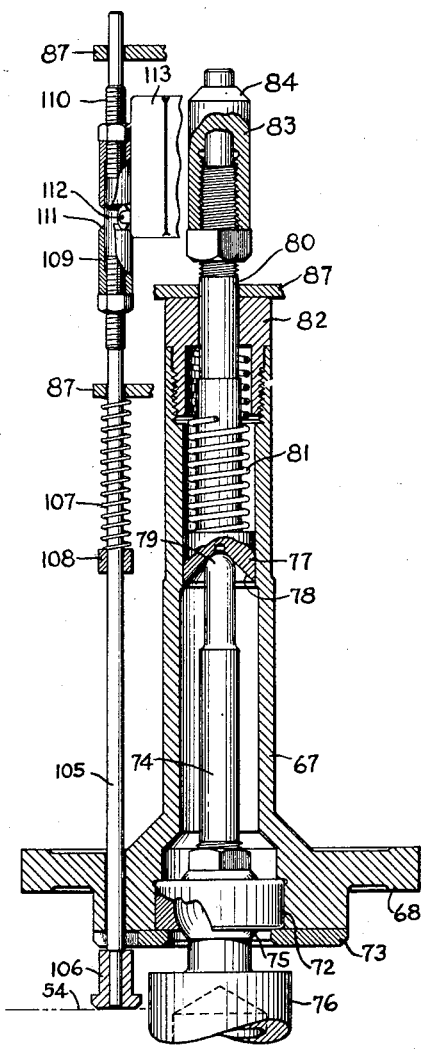
Fig. 12 is an enlarged longitudinal section of a feeler unit shown in Fig. 6.

As shown in Fig. 12, a generally spherical bearing socket 72 is disposed within the outer end of housing 67 and is retained in position within a recess formed in the inner wall of the housing by a retaining ring 73. A feeler 74, similar in construction to feeler 28, is disposed within the housing 67 with the outer end of the feeler projecting forwardly of the housing. The central portion of feeler carries a generally spherical bearing 75 which is adapted to fit within the spherical socket 72 and thereby permit the feeler 74 to be pivoted with universal movement about the axis of the housing 67.

The outer end of the feeler 74 is provided with a head 76 which has a generally tapered contour and is adapted to be received within the opening 53 in the spring hanger 7 as the feeler unit is moved toward the frame by operation of cylinder 57.

To gauge the amount of tilt or misalignment of the axis of the opening 53, a plunger 77 is slidably disposed within the housing 67 and is provided with a generally conical inner end surface 78 which is disposed in engagement with the spherical inner end 79 of feeler 74.

The plunger 77 supports a stem 80 which extends outwardly of the housing 67, and a spring 81 is disposed around the stem 80 and serves to bias the plunger 77 inwardly and thereby maintain engagement of the conical surface 78 with the inner end 79 of the feeler. Spring 81 is maintained within the housing 67 by a cap retainer 82.

With this construction, a tilt or misalignment of the axis of opening 53 in spring hanger 7 will be reflected by a pivotal movement of feeler 74 and a corresponding outward movement of plunger 77 and stem 80. Outward movement of the stem 80 is adapted to close an electrical circuit and light a lamp on the control panel which indicates misalignment of the axis of opening 53. This is accomplished by threading an adjustable nut 83 on the outer end of stem 80 and the nut is provided with a beveled outer edge 84 which is engaged by a roller 85 of a conventional micro-switch 86 as shown in Fig. 8. The micro-switch 86 is secured to a bracket 87 and the bracket in turn is secured to the cap retainer 82 so that the bracket 87 is integral with the feeler housing 67.

Figure 6:
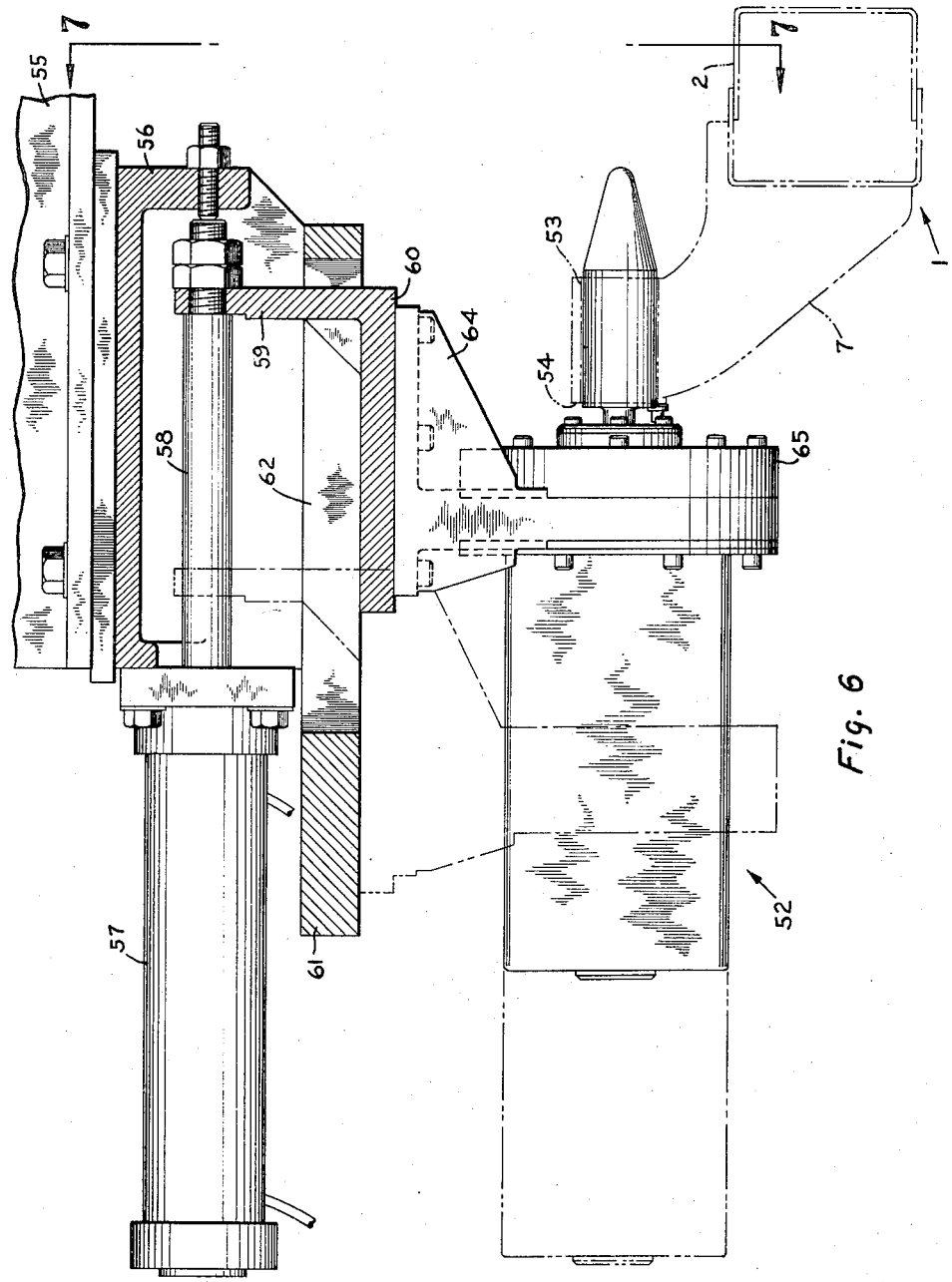
Fig. 6 is an enlarged fragmentary side elevation showing a retractable feeler unit.

In operation the feeler unit 52 and carriage 60 are initially in the rearward position indicated by the dashed lines in Fig. 6, as the frame 1 is elevated into the fixture 8. After the frame has been received and aligned within the fixture, the cylinders 57 are actuated to move the carriage and the attached feeler unit 52 forwardly and thereby bring head 76 of the feeler 74 into registry with the opening 53 in the spring hanger. If the axis of the opening 53 is properly aligned, there will be no pivotal movement of the feeler 74. However, if the axis of the opening is out of alignment, the feeler 74 will be pivoted and this pivotal movement will result in outward movement of plunger 77 and stem 80. When the stem 80 has moved outwardly a predetermined amount, the roller 85 of micro-switch 86 will ride upwardly on the outer surface of nut 83 to thereby actuate the micro-switch 86 and close the electrical circuit to light a lamp on a panel board in a manner similar to that described with respect to feeler 28.

After the frame has been gauged, the carriage and feeler unit 52 are withdrawn by action of the cylinder 57 to the rearward position. Withdrawal of the feeler unit moves the head 76 out of registry with opening 53 and the frame can then be lowered from the fixture.

Figure 10:
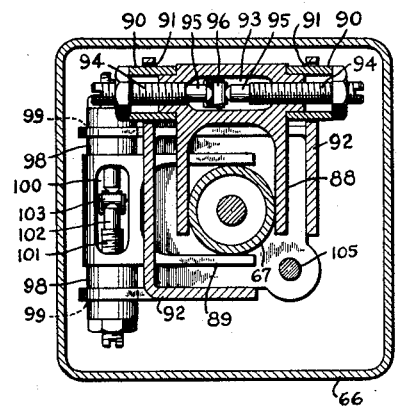
Fig. 10 is a transverse section taken along line 10—10 of Fig. 8.

To gauge the vertical and horizontal position of the hole 53 a pair of forks 88 and 89 are disposed about the feeler housing 67 as shown in Fig. 10. The lower bifurcated end of fork 88 straddles the housing 67 and the upper end portion of fork 88 is provided with a pair of outwardly extending arms 90 which are slidably disposed within openings 91 in a frame 92. The frame 92 is secured to the inner walls of the casing 66. The upper end of fork 88 is also provided with a slot 93 and a stud 94 is disposed within each of the arms 90 and is threaded within a suitable opening in the fork 88. The tapered inner ends 95 of studs 94 are disposed within slot 93 and spaced apart, and a roller 96 of a micro-switch 97 is adapted to normally rest in the notch between the adjacent ends 95 of the studs 94. The micro-switch 97 is secured to frame 92.

With the construction, if the hole 53 is displaced horizontally from its true position, the feeler 74 and filler housing 67 will be moved horizontally against the force of spring 70 which will cause fork 88 to slide within the openings 91 in frame 92. Horizontal movement of the fork 88 results in the studs 94 being moved relative to the roller 96 of micro-switch 97 and a predetermined amount of movement of fork 88 will cause the roller 96 to move out of the notch between the adjacent ends 95 of the studs 94 and thereby actuate the micro-switch and light a lamp on a panel board in a manner similar to that described with respect to the other feeler units.

The vertical displacement of the opening 53 is gauged in a similar manner. In this case the bifurcated end of fork 89 straddles the housing 67 and the fork is provided with vertical arms 98 which are slidably disposed within openings 99 in the frame 92. Fork 89 is provided with a slot 100 and carries studs 101 having tapered ends 102. The arms 98 and studs 101 are similar to the arms 91 and studs 94. The roller 103 of a micro-switch 104 is adapted to rest in the notch between the adjacent ends 102 of studs 101 and vertical movement of fork 89 resulting from a vertical displacement of opening 53 in the spring hanger 7 will tend to displace the roller 103 from the notch and thereby actuate micro-switch 104 and light a lamp indicating vertical misalignment of the opening 53.

As in the case of the feeler units 28, the micro-switches 97 and 104 are not actuated until a predetermined amount of movement of the feeler housing 67 has occurred and this amount of movement corresponds to the tolerance limits of the position of the spring hanger opening 53.

While the horizontal and vertical gauging of opening 53 and the gauging of the axis of the opening 53 have been described with a single limit micro-switch and lamp to indicate the tolerance limits of a specific location on the frame, it is contemplated that a number of micro-switches and lamps may be employed with each gauging device to indicate increments of misalignment approaching the tolerance limits.

To gauge the face 54 of spring hanger 7 adjacent opening 53, a rod 105 is slidably disposed within openings in the flange 68 of housing 67 and within openings in the bracket 87. The forward end of rod 105 is provided with a head 106 which has a generally flat outer face adapted to engage the face 54 of spring hanger 7. The rod 105 is biased outwardly by a spring 107 which is interposed between bracket 87 and spring stop 108. The spring 107 serves to urge the rod 105 outwardly and positions the head 106 outwardly beyond the position normally assumed by the head when subsequently engaged with face 54 during the gauging operation.

As the carriage 60 is moved forwardly toward the frame the rod 105 moves forwardly until the head 106 engages the face 54. The position of head 106 when in engagement with face 54 is indicated by means of an adjustable coupling 109 which connects the end of the rod 105 and a rod extension 110 which is slidably disposed within an opening in bracket 87. The coupling 109 is provided with a circumferential groove 111 which normally receives a roller 112 of a micro-switch 113 when the face 54 is in proper lateral alignment. If the face 54 is not in proper alignment, it being displaced laterally toward or away from the center of the frame, the roller 112 will ride on the upper surface of coupling 109 to actuate micro-switch 113 and light a lamp or bulb on the control panel indicating the misalignment of the face 54. Due to the action of spring 107 the rod 105 is normally urged beyond its "zero" or aligned position when the frame is not being gauged and thus the lamp on the control panel may normally be on and will not turn off unless the face 54 is properly aligned and the roller 112 rests in the groove 111.

The present invention provides a continuous check of the alignment of each frame after the same is assembled in the assembly line. The frame is fixed in position at a series of spaced locations by pilot means to provide fixed stations for the gauging. The gauging operation is accomplished by a plurality of feeler units of simple construction which gauge the alignment of a specific location on the frame and the degree and position of any misalignment of the frame is automatically indicated on a control panel so that the necessary correction can be made in the assembly or production lines to correct the misalignment and thus assuring a continuous production of frames within specified tolerances.

Various embodiments of the invention may be employed within the scope of the following claims which particularly point out and distinctly claim the subject matter regarded as the invention.

I claim:

1. An apparatus for gauging an opening in an article which comprises, a fixture to receive and align the article for gauging, a universally pivotable feeler member connected to the fixture and adapted to be received within the opening, means responsive to pivotal movement of the feeler member as the member is received within the opening for indicating the degree of tilt of the axis of said opening from the normal position of said axis, means associated with the feeler member and operable as the member is received within the opening for indicating the displacement of the axis of said opening laterally in one direction from said normal position, and means associated with said feeler and operable as the feeler is received within the opening for indicating the displacement of said axis laterally from the normal position thereof in a direction 90° from said first-named direction.

2. In an apparatus for gauging an opening in an article, a supporting member, feeler means adapted to be received within the opening to be gauged, means for resiliently mounting said feeler means with respect to the supporting member to permit the feeler means to float freely in a radial direction when said feeler means is received within said opening, a pair of forked members disposed in engagement with said feeler means and slidably mounted with respect to said supporting member, one of said forked members being slidable in a generally vertical direction in accordance with vertical movement of said feeler means and the other of said forked members slidable in a horizontal direction in accordance with horizontal movement of said feeler means, a pair of electric circuits, a signal device connected in each of said circuits, and circuit closing means for each of said circuits with each of the circuit closing means being responsive to a predetermined amount of movement of a forked member for closing the respective circuit and energizing the signal device to indicate the degree of radial displacement of the axis of said opening from a normal position.

3. In an apparatus for gauging an opening in an article, a supporting member, feeler means adapted to be received within the opening to be gauged, means for resiliently mounting said feeler means with respect to the supporting member to permit the feeler means to float freely in a radial direction when said feeler means is received within said opening, a pair of forked members disposed in engagement with said feeler means and slidably mounted with respect to said supporting member, one of said forked members being slidable in a generally vertical direction in accordance with vertical movement of said feeler means and the other of said forked members being slidable in a horizontal direction in accordance with horizontal movement of said feeler means, a pair of electric circuits, a lamp connected in each of said circuits, switch means connected in each of said circuits, and separate means associated with each of said fork members for closing one of said switch means to energize the corresponding lamp and indicate the amount of displacements of the axis of said opening from a normal position when the respective fork member has been displaced a predetermined distance.

4. In an apparatus for gauging the misalignment from a desired position of the axis of an opening in a member, a fixture to receive the member, pilot means for maintaining a fixed positional relationship between the member and the fixture, a feeler mounted on the fixture and having an axis normally disposed parallel to the axis of a properly aligned opening, means associated with said feeler to permit pivotal movement thereof about said normally disposed axis and to permit lateral movement thereof in a direction normal to said normally disposed axis, means to bring said feeler and said member into engagement so that said feeler is received within the opening, means to effect pivotal movement of said feeler if the axis of said opening is tilted from the desired position, means to effect lateral displacement of said feeler if the axis of said opening is shifted in a direction normal to the axis of a properly aligned opening, means responsive to a given degree of pivotal movement of said feeler to indicate that the axis of said opening is misaligned, and means responsive to a given degree of lateral displacement of said feeler to indicate that the axis of said opening is misaligned laterally.

5. In an apparatus for gauging an opening in an article, a support member, a housing, resilient means for resiliently mounting said housing with relation to said support member, a feeler mounted within said housing and extending outwardly therefrom and having an end defining a head adapted to be received within the opening to be gauged, said feeler and said housing being free to float in a direction normal to the axis of the feeler and against the force of said resilient means as said feeler is received within said opening, means connected to the housing and responsive to displacement of said housing in two separate directions normal to the axis of the feeler for indicating the degree of lateral misalignment of the axis of said opening, means for mounting the feeler for universal pivotal movement within the housing, and means connected to the feeler and responsive to pivotal movement of the feeler as the feeler is received within said opening for indicating the degree of tilt of the axis of said opening.

6. In an apparatus for gauging the misalignment from a desired position of the axis of an opening in a member, a fixture to receive the member, a feeler mounted on the fixture and having an axis normally disposed parallel to the axis of a properly aligned opening, means for mounting said feeler for pivotal universal movement, means for mounting said feeler for lateral movement in a direction normal to said normally disposed axis to permit said feeler to be displaced laterally as the axis of said opening is shifted in a direction normal to the axis of a properly aligned opening, means responsive to a given degree of pivotal movement of said feeler for indicating the degree of tilt of the axis of the opening from the axis of a properly aligned opening, and means responsive to a given degree of lateral displacement of said feeler to indicate the degree of lateral misalignment of the axis of the opening from the axis of a properly aligned opening.

7. In an apparatus for gauging the misalignment from a desired position of the axis of an opening in a member, a fixture to receive the member, a feeler mounted on the fixture and having an axis normally disposed parallel to the axis of a properly aligned opening, means for mounting said feeler for universal movement to permit said feeler to be tilted if the axis of the opening is tilted from the axis of a properly aligned opening, means for mounting said feeler for lateral movement in a direction normal to said normally disposed axis to permit said feeler to be displaced laterally if the axis of said opening is shifted in a direction normal to the axis of a properly aligned opening, a first electrical circuit, an indicator connected in said electrical circuit, circuit closing means disposed in said first circuit and disposed to be actuated by a given amount of pivotal movement of said feeler to close said circuit and energize said indicator, a second electrical circuit, an indicator connected in said electrical circuit, and second circuit closing means connected in said second electrical circuit and disposed to be actuated by a given amount of lateral displacement of said feeler to close said second circuit and energize said second indicator.

8. In an apparatus for gauging the misalignment from a desired position of the axis of an opening in a member, a fixture to receive the member, a feeler mounted on the fixture and having an axis normally disposed parallel to the axis of a properly aligned opening, means for mounting said feeler for pivotal universal movement, means for mounting said feeler for lateral movement in a direction normal to said normally disposed axis to permit said feeler to be displaced laterally as the axis of said opening is shifted in a direction normal to the axis of a properly aligned opening, a plurality of first electrical circuits, a visual indicator connected in each of said electrical circuits, circuit closing means associated with each of said circuits for closing the respective circuits and energizing the corresponding indicator, each of said circuit closing means being actuated by a progressively greater amount of pivotal movement of said feeler to thereby indicate the degree of tilt of the axis of the opening with respect to the axis of a properly aligned opening, a plurality of second electrical circuits, a visual indicator connected in each of said second electrical circuits, and second circuit closing means associated with each of said second circuits for closing the respective circuit and energizing the corresponding indicator, each of said second circuit closing means being actuated by a progressively greater amount of lateral displacement of said feeler to thereby indicate the degree of lateral displacement of the axis of the opening from a properly aligned opening.

9. In an apparatus for gauging an opening in an article, a support member, feeler means extending outwardly from the support member and adapted to enter the opening to be gauged, pivotal means carried by said support member and mounting said feeler means for universal pivotal movement relative to said support member to provide for tilting of said feeler means as it enters the opening, separate resilient means biasing said pivotal means to a predetermined position relative to said support member and providing for lateral movement of said pivotal means and feeler means bodily relative to the support member, and separate resilient means biasing said feeler means against pivotal tilting.

References Cited in the file of this patent

UNITED STATES PATENTS

| | | |
|---|---|---|
| 992,460 | Updergraff | May 16, 1911 |
| 1,413,232 | Miolla | Apr. 18, 1922 |
| 2,090,178 | Brickner | Aug. 17, 1937 |
| 2,305,824 | Zwick | Dec. 22, 1942 |
| 2,622,132 | Stockton | Dec. 16, 1952 |
| 2,668,361 | Stalhandske | Feb. 9, 1954 |

FOREIGN PATENTS

| | | |
|---|---|---|
| 334,222 | Italy | Jan. 23, 1936 |
| 887,651 | France | Nov. 19, 1943 |
| 859,962 | Germany | Dec. 18, 1952 |

OTHER REFERENCES

Product Engineering, pgs. 96–97, Jan. 1947.